United States Patent [19]

Trzecieski

[11] 4,333,954
[45] Jun. 8, 1982

[54] SOFT ICE CREAM AND PROCESS FOR PRODUCTION THEREOF

[75] Inventor: Jan Trzecieski, Naerum, Denmark

[73] Assignee: Kirk Chemicals, Denmark

[21] Appl. No.: 204,803

[22] Filed: Nov. 7, 1980

[30] Foreign Application Priority Data

Nov. 12, 1979 [DK] Denmark .............................. 4779/79

[51] Int. Cl.³ .......................... A23G 9/04; A23G 9/02
[52] U.S. Cl. ......................................... 426/41; 426/42; 426/60; 426/565
[58] Field of Search ................. 426/565, 566, 567, 41, 426/42, 34, 204, 803

[56] References Cited

U.S. PATENT DOCUMENTS

| | | | |
|---|---|---|---|
| 1,414,214 | 4/1922 | Sanna | 426/565 |
| 1,737,101 | 11/1929 | Turnbow | 426/565 |
| 2,465,905 | 3/1949 | Meade et al. | 426/41 |
| 2,681,858 | 6/1954 | Stimpson | 426/41 |
| 2,738,279 | 3/1956 | Stimpson | 426/565 |
| 2,749,242 | 6/1956 | Stimpson | 426/41 |
| 2,826,502 | 3/1958 | Sfortunato et al. | 426/41 |
| 2,826,503 | 3/1958 | Roberts et al. | 426/41 |
| 3,615,662 | 10/1971 | Ellinger et al. | 426/565 |
| 3,852,496 | 12/1974 | Weetall | 426/41 |

*Primary Examiner*—Jeanette M. Hunter
*Attorney, Agent, or Firm*—Fidelman, Wolffe & Waldron

[57] ABSTRACT

Production of a soft ice cream on the basis of fats, optionally milk solid non-fat, demineralized whey powder, sugars, stabilizers, emulsifying agents, lactase, optionally aromas and/or coloring matters, and water. The ingredients, except the fats, are mixed and kept at a temperature ranging from about 30° C. to about 50° C. for a period from about 1 to about 3 hours, whereafter the fats are added, and then the mixture is pasteurized, homogenized, cooled, optionally ripened, and frozen, with the addition of aromas and/or coloring matters, if desired.

6 Claims, No Drawings

SOFT ICE CREAM AND PROCESS FOR PRODUCTION THEREOF

The present invention relates to an ice cream product and to a process for the production of a soft or reduced in hardness ice cream on the basis of fats, optionally milk solid non-fat, different sugars, lactase, stabilizers, emulsifying agents, optionally aromas and/or coloring matters, and water by which process the ingredients are mixed and the mixture is pasteurized, homogenized, cooled, optionally ripened, and frozen with addition of aromas and/or coloring matters, if desired.

It is generally known that ice cream consumers prefer non-hard products having an agreeable creamy structure. In this connection it is first of all a question of dessert ice cream and manually portioned ice cream (old-fashioned ice cream) and not of ice cream bars and so-called soft ice representing quite another complex of problem.

Improved freezer construction and cooling performance as well as the general tendency to consume ice cream freshly removed from the freezer, i.e., without any kind of previous warming, has created a demand for ice cream that is not hard at low temperatures, for instance, about $-20°$ C.

In order to comply with this demand, ice cream producers have tried to produce an ice cream that is not hard at low temperatures. This can be achieved in various ways, for instance, by using low-hardened vegetable fats; by using glycerol, preferably between 2 and 4%, by partially replacing saccharose by different monosaccharides, as for instance, glucose syrup, dextrose and sorbitol; by using different stabilizers and emulsifying agents, which in big or small amounts have a certain effect on the hardness of the ice cream; and by using different processing conditions, as for instance, heat treatment of the mixture, special ripening, and freezing conditions and the like.

Common to all the above mentioned methods is that none of them provides really good results, and that most of them entail disadvantages, such as after-taste, collision with the existing legislation and often increased production costs.

Ice cream is commonly produced by using the following ingredients:
Fats: about 7 to 12%
MSNF: about 9 to 12%
Saccharose: about 10 to 14%
Monosaccharides: about 3%
Emulsifying/Stabilizing Mixture: about 0.4 to 0.6%
Water up to: 100%

The percentages stated above and below are all calculated on the basis of the total weight of the mixture.

The edible fats used may be butter fat or vegetable fat.

MSNF stands for milk solid non-fat. Usually, concentrated skimmed milk or skimmed milk powder is used. MSNF mainly contains lactose, casein, glubulin and albumin. It is known to replace 10 to 30% of MSNF by demineralized whey powder. Demineralized whey powder mainly contains lactose, globulin and albumin. This replacement gives a considerable economic gain, but simultaneously it involves a risk of producing a.o. sandy ice cream, i.e., ice cream containing lactose crystals.

Ice cream produced by use of the above mentioned substances is hard, and only by adding the previously mentioned additives and by using special conditions it is possible to produce a soft ice cream.

Furthermore, it has been proposed to use lactase in the production of ice cream in order to avoid crystallization of lactose in the ice cream. The presence of lactose crystals in the ice cream entails a so-called "sandy" structure, which is undesirable, but this phenomenon has nothing in common with the softness/hardness properties of the ice cream. In practice, lactase is not used in the production of ice cream.

It has been found that a reduced in hardness ice cream may be produced by replacing all or part of the milk solid non-fat by demineralized whey powder, adding lactase and keeping the mixture at a temperature of about 30° C. to about 50° C. for a period from about 1 to about 3 hours before the pasteurization.

In accordance herewith, the process according to the invention is characterized in that the ingredients, except the edible fats, are mixed, the milk solid non-fat wholly or partially being replaced by demineralized whey powder so that the ratio between milk solid non-fat and demineralized whey powder is 0:1 to 1:1, the mixture is kept at a temperature of from about 30° C. to about 50° C. for a period of from about 1 to about 3 hours, whereafter the edible fats are added.

In accordance with the present invention a very soft ice cream can be produced by using for instance:
Butter or vegetable fats: 10%
Demineralized whey powder: 12%
Saccharose: 12%
Dextrose: 3%
Lactase Preparation: 0.3%
Emulsifying/Stabilizing combination: 0.5%
Water: 62.2%

The hardness of ice cream can be measured by means of a so-called penetrometer being used in the butter and margarine industry. As an expression of the hardness, the so-called log C value is used, which, in the case of a soft or reduced in hardness ice cream should be below 2.8. However, insofar as ice cream is concerned this way of measuring is very vague and practically inapplicable, a.o., due to the fluctuating temperature in the block of ice cream.

For the determination of the hardness of the ice cream in connection with the present invention an apparatus is used, which by means of a sufficiently loaded stainless steel wire cuts through a block of ice cream having a fixed temperature. The time it takes the loaded stainless steel wire to cut through the block of ice cream is an excellent expression of the hardness of the ice cream. An ice cream is very hard when a block thereof, measuring $10 \times 8$ cm and having a thickness of 5 cm at a temperature of $-20°$ C. is cut through in more than about 10 minutes by a stainless steel wire having a diameter of 0.5 mm and being loaded with 1 kg, and an ice cream is very soft when the block under corresponding conditions is cut through by the same wire, however, only loaded with 0.5 kg, in less than about 3 minutes.

By the process according to the invention the milk solid non-fat is wholly or up to 50% by weight replaced by demineralized whey powder i.e., is employed in the ratio 0:1 to 1:1, as previously stated. The ingredients, except the fats, are mixed, whereafter the mixture is kept under conditions suited to enzymatic hydrolysis of lactose, namely at a temperature ranging from about 30° C. to about 50° C. for a period of from 1 to about 3 hours, whereafter the edible fats are added prior to the pasteurization. Pasteurization deactivates the lactase.

The remaining process steps, i.e., pasteurization, homogenization, addition of aromas and/or coloring matters, if desired, cooling, ripening, if desired, and freezing are carried out in a manner known per se in the production of ice cream. When, by the process according to the invention, the mixture is kept at a temperature ranging from about 30° C. to about 50° C. for a period of from about 1 to 3 hours prior to the pasteurization, the lactase causes hydrolysis of lactose to glucose and galactose to an extent of at least about 50%, up to 70% being preferred.

According to the invention it has been found to be particularly advantageous to replace the milk solid nonfat wholly by demineralized whey powder, in which way a very soft ice cream is achieved.

By and large, the proportions of the various ingredients may vary as follows:
Fats: 7–12%
MSNF: 0–6%
Demineralized Whey: 9–12%
Monosaccharide: about 3%
Emulsifier/Stabilizer: about 0.4–0.6%
Water up to: 100%

By using the process according to the invention it is possible to produce a very soft ice cream without using additives such as glycerol, sorbitol and the like, and it is possible to adjust the hardness of the ice cream by varying the ratio between demineralized whey powder and MSNF. Furthermore, the production of ice cream by means of demineralized whey powder offers great economic advantages as it is much cheaper than skimmed milk and skimmed milk powder. Use of aromas and/or coloring matter to flavor ice cream can be continued as heretofore with the composition and method of this invention.

The process and composition according to the invention is further illustrated in the following Examples, in which all percentages are percentages by weight calculated on the ready mixture.

EXAMPLE 1

A mixture was prepared of the following ingredients:
Demineralized whey powder: 480 g
Saccharose: 480 g
Dextrose: 120 g
Lactase Preparation ("Lactozym" ® 750L): 12 g
Emulsifying/stabilizing combination ("PANISOL" PI SUPER): 20 g
Water: 2488 g The mixture was kept at a temperature of about 40° C. for about 2 hours with slow stirring, heated to about 50° C., then 400 g of butter (water content 16%) was added and the completed mixture was heated to about 70° C. and homogenized in a one-stage homogenizer at a pressure of about 200 kg/cm$^2$. The homogenized mixture was cooled to about 4° C. and kept at this temperature for about 6 hours. Thereafter, the mixture was frozen at about −4° C., whereafter it was hardened at about −20° C. to −30° C.

A soft ice cream was produced, which at a test using the previously described cutting method showed a time of cutting of 3 minutes at a load of 0.5 kg.

When using the above described process, however, replacing the butter by a corresponding quantity of vegetable fats (soya/coconut oil hardened to 42° C.) and by using a homogenizing pressure of 170 kg/cm$^2$, a soft ice cream was produced, showing a time of cutting of <3 minutes at a load of 0.5 kg.

COMPARATIVE EXAMPLE 1a

A mixture was prepared of the following ingredients:
Butter (water content 16%): 400 g
Skimmed milk powder: 480 g
Saccharose: 480 g
Dextrose: 120 g
Emulsifying/stabilizing combination ("PANISOL" PI SUPER): 20 g
Water: 2500 g The mixture was heated to about 70° C. and homogenized in a one-stage homogenizer at a pressure of about 200 kg/cm$^2$. The homogenized mixture was cooled to about 4° C. and kept for about 6 hours at this temperature. Thereafter the mixture was frozen at about −4° C., whereafter it was hardened at about −20° C. to −30° C.

A hard ice cream was produced showing a time of cutting of <10 minutes at a load of 1 kg.

When using the above described process, however, replacing the butter by a corresponding quantity of vegetable fats (soya/coconut oil hardened to 42° C.) and by using a homogenizing pressure of 170 kg/cm$^2$, a hard ice cream was produced showing a time of cutting of >10 minutes at a load of 1 kg.

COMPARATIVE EXAMPLE 1b

A mixture was prepared of the following ingredients:
Skimmed milk powder: 480 g
Saccharose: 480 g
Dextrose: 120 g
Lactase preparation ("Lactozym" ® 750L): 12 g
Emulsifying/stabilizing combination ("PANISOL" PI SUPER): 20 g
Water: 2488 g The mixture was kept at a temperature of about 40° C. for about 2 hours with slow stirring, heated to about 50° C., 400 g of butter (water content 16%) was added, the mixture was heated to about 70° C. and homogenized in a one-stage homogenizer at a pressure of about 200 kg/cm$^2$. The homogenized mixture was cooled to about 4° C. and kept for about 6 hours at this temperature. Then the mixture was frozen at about −4° C. whereafter it was hardened at about −20° C. to −30° C.

A medium hard ice cream was produced which in a test using the previously described method showed a time of cutting of 7 to 8 minutes at a load of 1 kg.

When using the above described process, however, replacing the butter by a corresponding quantity of vegetable fats (soya/coconut oil hardened to 42° C.) and by using a homogenizing pressure of 170 kg/cm$^2$, a medium hard ice cream was produced, showing a time of cutting of 7 to 8 minutes at a load of 1 kg.

EXAMPLE 2

A mixture was prepared of the following ingredients:
Skimmed milk powder: 96 g
Demineralized whey powder: 384 g
Saccharose: 480 g
Dextrose: 120 g
Lactase preparation ("Lactozym" ® 750L): 12 g
Emulsifying/stabilizing combination ("PANISOL" PI SUPER): 20 g
Water: 2488 g The mixture was kept at a temperature of about 40° C. for about 2 hours with slow stirring, heated to about 50° C., 400 g of butter (water content 16%) was added, the mixture was heated to about 70° C. and homogenized in a one-stage homogenizer at a pressure of about 200 kg/cm². The homogenized mixture was cooled to about 4° C. and was kept at this temperature for about 6 hours. Then the mixture was frozen at about −4° C., whereafter it was hardened at about −20° to −30° C.

A medium soft ice cream was produced, which in a test using the previously described method showed a time of cutting of 5 to 6 minutes at a load of 0.5 kg.

When using the above described process, however, replacing butter by a corresponding quantity of vegetable fats (soya/coconut oil hardened to 42° C.) and by using a homogenizing pressure of 170 kg/cm², a medium soft ice cream was produced, showing a time of cutting of 5 to 6 minutes at a load of 0.5 kg.

COMPARATIVE EXAMPLE 2

A mixture was prepared of the following ingredients:
Butter (water content 16%): 400 g
Skimmed milk powder: 96 g
Demineralized whey powder: 384 g
Saccharose: 480 g
Dextrose: 120 g
Emulsifying/stabilizing combination ("PANISOL" PI SUPER): 20 g
Water: 2500 g The mixture was heated to a temperature of about 70° C. and homogenized in a one-stage homogenizer at a pressure of about 200 kg/cm². The homogenized mixture was cooled to about 4° C. and was kept at this temperature for about 6 hours. Then the mixture was frozen at about −4° C., whereafter it was hardened at about −20° C. to −30° C.

A hard ice cream was produced showing a time of cutting of >10 minutes at a load of 1 kg.

When using the above described process, however, replacing the butter by a corresponding quantity of vegetable fats (soya/coconut oil hardened to 42° C.) and by using a homogenizing pressure of 170 kg/cm², a hard ice cream was produced showing a time of cutting of >10 minutes at a load of 1 kg.

It can be seen from Examples 1 and 2 that the ice cream produced according to the invention has a desired low hardness i.e., soft as expressed by the measured hardness. The soft ice cream may be portioned and eaten immediately after having been removed from the freezer, which, on the contrary, is not the case with the ice cream prepared in a manner known per se according to the Comparative Examples 1a, 1b and 2, which ice cream has a substantially greater hardness.

I claim:

1. A process for the production of a reduced in hardness ice cream which comprises mixing demineralized whey powder, lactase, sugars, stabilizer, emulsifier and water, the demineralized whey being present as about 9–12% by weight of the ice cream, then holding the resulting mixture under conditions suited to enzymatic hydrolysis of lactose until at least about 50% of the lactose content in the mixture has been hydrolyzed, thereafter in succession adding edible fat, the edible fat being present as about 7–12% by weight of the ice cream, pasteurizing, homogenizing and freezing and then hardening.

2. The process of claim 1 wherein the mixture is held at 30°–50° C. for 1–3 hours.

3. The process of claim 1 which comprises including within the ingredients being admixed milk solids non-fat in amounts up to a 1:1 ratio by weight of the demineralized whey powder.

4. The process of claim 3 wherein the mixture is held at 30°–50° C. for 1–3 hours.

5. A soft ice cream composition comprising demineralized whey, sugars, stabilizer, emulsifier, deactivated lactase, water and edible fat, the demineralized whey being about 9–12% by weight of the ice cream and the edible fat being about 7–12% by weight of the ice cream and at least about 50% of the lactose originally present in said demineralized whey being hydrolyzed.

6. The soft ice cream composition of claim 5 wherein the composition further includes non-fat milk solids in amounts up to a 1:1 ratio by weight of the demineralized whey.

* * * * *